Aug. 25, 1931.  V. G. HONSTAIN  1,820,743
CREEPER FOR TRACTOR BELTS
Filed Feb. 9, 1928
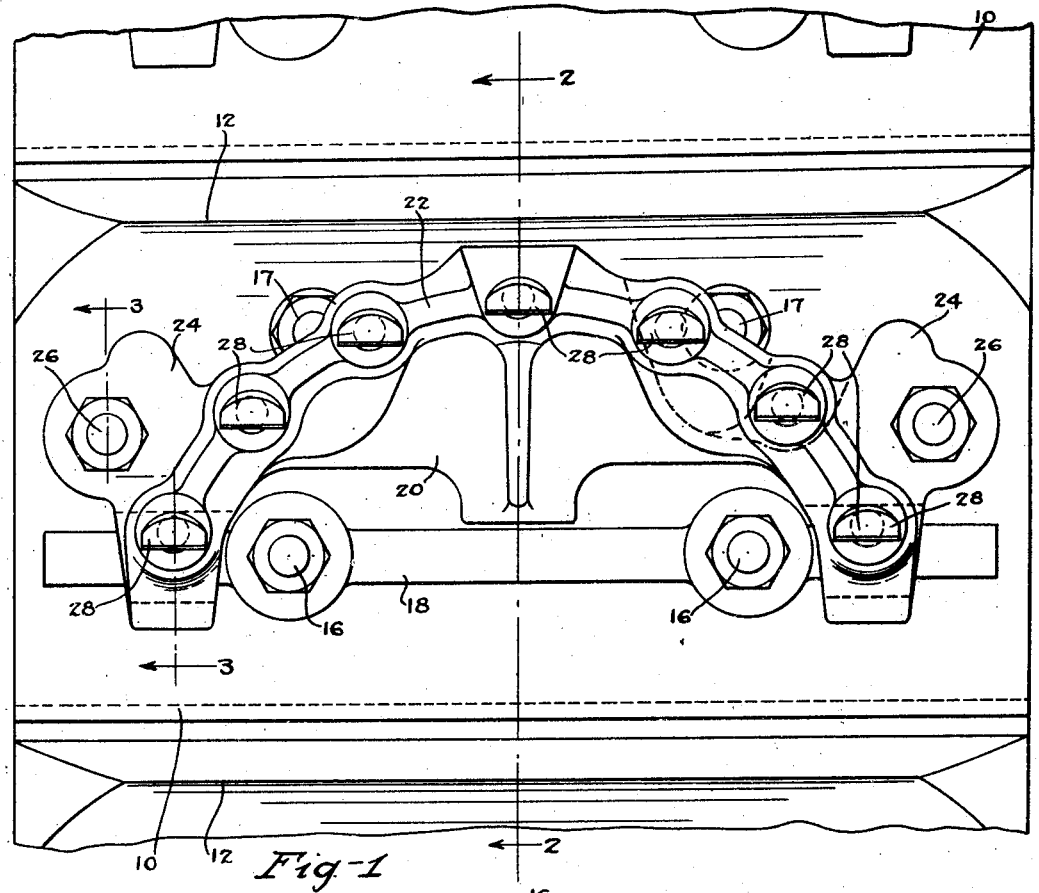
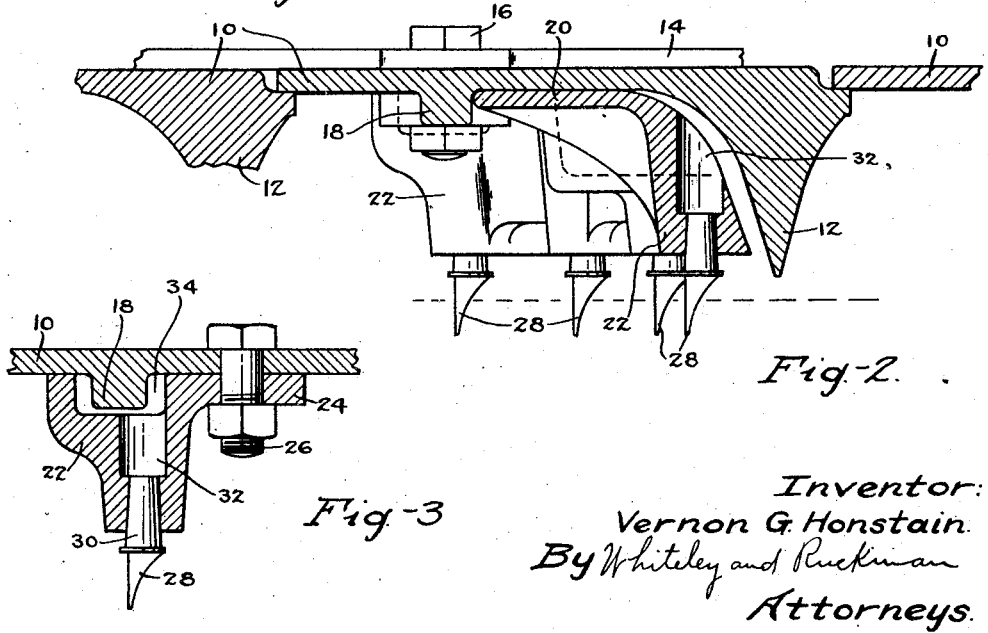
Inventor:
Vernon G. Honstain.
By Whiteley and Ruckman
Attorneys.

Patented Aug. 25, 1931

1,820,743

UNITED STATES PATENT OFFICE

VERNON G. HONSTAIN, OF MINNEAPOLIS, MINNESOTA

CREEPER FOR TRACTOR BELTS

Application filed February 9, 1928. Serial No. 253,029.

My invention relates to creepers for tractor belts, and an object is to provide a non-slip and non-skid device for use with tractors of the track laying type. I am aware that it has been proposed to provide belts of this character with transversely extending ribs or cleats, but my experience has been that the employment of such ribs or cleats leaves much to be desired particularly in regard to side slip or skidding when an attempt is made to run the tractor over ice and hard packed snow. I have found that slipping both lengthwise and sidewise of the tractor is very effectively prevented by providing the tractor belt with a plurality of groups of calks arranged in such manner that each group of calks extends transversely of the belt with the calks of each group arranged in offset relation to one another. A convenient form of such offset relationship is produced by arranging the calks of each group in such manner that they lie along a curved line passing from one side of the belt to the other side. The calks when thus arranged retain their full efficiency in regard to preventing lengthwise slip of the tractor chain, and at the same time the tendency of the tractor to slip sidewise is very much less than would be the case if the calks were arranged in straight lines transversely of the belt. As a further feature of my invention, I attach the calks to the belt in such manner that they may be readily removed for sharpening or replacement and may also be removed when it is desired to run the tractor without them.

The full objects and advantages of my invention will appear in connection with the detailed description thereof, and the novel features of my inventive idea will be particularly pointed out in the claims.

In the accompanying drawings which illustrate one form in which my invention may be embodied,—

Fig. 1 is a plan view of a concrete example of the invention applied to a tractor belt. Fig. 2 is a view in section on the line 2—2 of Fig. 1. Fig. 3 is a view in section on the line 3—3 of Fig. 1.

The tractor belt to which the creeper is attached may be of any suitable construction and is shown as comprising a succession of plates 10 upon the ground engaging sides of which there are transverse wedge-shaped bars or lugs 12 located at the forward ends of the plates. These plates in the embodiment shown are secured to a chain 14 by bolts 16 and 17 passing therethrough. The bolts 16 pass through ribs 18 on the underside of the plates. My attachment comprises a block preferably in the form of a casting consisting of a base member 20 which carries a curved projection 22 as will be apparent from Fig. 1, the base member also being provided with lugs 24 through which bolts 26 extend for securing the block or casting to one of the plates 10. It will be understood that each of the plates 10 of the belt is preferably provided with one of the blocks or castings. The curved projection 22 is provided with a series of spaced holes each of which receives the shank of a calk 28. In the embodiment shown, there are seven of these calks in the group carried by each casting, these calks of course being arranged on a curve due to the curvature of the projection 22. The calks may be secured in any suitable manner and as shown have tapered shanks 30 which fit into correspondingly tapered holes in the projection 22 so as to be held firmly when driven in. The calks are preferably wedge shaped with their widths disposed transversely when in place. As shown in Fig. 3, the casting above the tapered holes is provided with larger openings 32 so that when the casting is removed from the belt, the calks may be readily driven out in order that they may be sharpened or replaced with new calks. As will also be apparent from Fig. 3, the ends of the casting are provided with depressions 34 for receiving the end portions of the rib 18.

The operation and advantages of my invention will be readily understood in connection with the foregoing description. The device is of special utility for attachment to tractors which are being used for clearing heavy snow and ice from streets and driveways. The device may be readily removed when it is not desired to use the same in connection with tractors which are employed on surfaces which are not slippery.

I claim:

A creeper for endless tractor belts comprising a casting which includes a base member and a curved projection extending laterally across the outer face of the base member, said projection containing a plurality of holes whose inner end portions are enlarged and whose outer end portions taper inwardly, the ends of said base member being provided with transverse depressions which open into the enlarged end portions of the two outside holes in said projection, said depressions being adapted to receive a transverse rib on the underside of a plate of the tractor belt, calks having tapered shanks inserted in the tapered portions of said holes, and means for securing said casting to a plate of the tractor belt.

In testimony whereof I hereunto affix my signature.

VERNON G. HONSTAIN.